United States Patent [19]

Abrams

[11] Patent Number: 4,888,373
[45] Date of Patent: Dec. 19, 1989

[54] HIGHER SOLIDS SOLVENT-BASED POLYSETER COATING COMPOSITION

[75] Inventor: Sonja M. J. Abrams, Leuven, Belgium

[73] Assignee: E. I. Du Pont de Nemours and Company, Wilmington, Del.

[21] Appl. No.: 210,336

[22] Filed: Jun. 23, 1988

[51] Int. Cl.⁴ .................... C08L 1/14; C08L 67/08
[52] U.S. Cl. .................................... 524/197; 524/315; 524/216; 524/502; 524/507; 524/512; 524/513
[58] Field of Search ............... 524/197, 315, 216, 502, 524/507, 512, 513

[56] References Cited

U.S. PATENT DOCUMENTS

| | | | |
|---|---|---|---|
| 3,893,956 | 7/1975 | Brandt | 524/216 |
| 4,131,581 | 12/1978 | Coker | 524/216 |
| 4,461,858 | 7/1984 | Adelman | 524/502 |
| 4,551,492 | 11/1985 | Aerts | 524/40 |

FOREIGN PATENT DOCUMENTS 2313444 9/1974 Fed. Rep. of Germany .
125831 9/1979 Japan .

*Primary Examiner*—John Kight
*Assistant Examiner*—Dennis R. Daley
*Attorney, Agent, or Firm*—Richard H. Burgess

[57] ABSTRACT

A 35–40% weight spray solids coating composition can be achieved with a binder consisting of about 35% polyester, 30% melamine crosslinker and 30% acrylic resin containing a thixotropic agent.

6 Claims, No Drawings

HIGHER SOLIDS SOLVENT-BASED POLYSETER COATING COMPOSITION

BACKGROUND OF THE INVENTION

Solvent-based coating composition containing polyester, melamine crosslinkers, plasticizer, wax dispersions and cellulose acetate butyrate resins are available at 14% and 18% solids level. The latter is shown in U.S. Pat. No. 4,551,492—Aerts et al (1985). It is desirable to be able to increase the application solids to the 30–40% level to decrease the expense of the solvents, the heat needed to evaporate them and the air pollution effects of the evaporated solvents, and to have a broader application latitude.

SUMMARY OF THE INVENTION

The present invention provides a coating composition with a binder consisting essentially, in percent by weight, of about 30–40% polyester resin, 25–35% of a melamine crosslinker resin, 2–5% polyethylene vinyl acetate copolymer wax dispersion, 25–35% of a styrenated acrylic resin containing a thixotropic agent with 0.5–2% thixotropic agent based on solids binder, flow additives, plus optionally pigments and extenders. Pigments are used in the pigment-to-binder weight ratios in the range of 10–40 units of pigment to 100 units of binder.

DETAILED DESCRIPTION OF THE INVENTION

To increase the solids content of polyester containing coatings which are the subject of the invention, an acrylic resin containing thixotropic agent has been included as a replacement for the cellulose acetate butyrate resin. In the following example and comparative test, parts, percentages and proportions are by weight except where indicated otherwise. The components indicated provide the resin solids. They are formulated with suitable amounts of fast and slow, polar and non-polar solvents to achieve the indicated solids content. The comparative test is from the above-identified Aerts patent.

| Comparative Test 18% by Weight Spray Solids | Parts |
|---|---|
| Polyester resin at 50% solids in 50–50 blend butylacetate-xylene Dynapol H700 (Dynamite Nobel) | 39.6 |
| Melamine crosslinker resin partially butylated at 55% solids in isobutyl alcohol Maprenal MF650 (Hoechst) | 26.4 |
| Polyurea plasticizer-carbamic acid ester from butylurethane and formaldehyde Resamine HF450 (Hoechst) | 10.0 |
| Polyethylene vinyl acetate copolymer, as a 6% wax dispersion in xylene-butylacetate in a ratio of 40/54 | 8.0 |
| 2 Secs cellulose acetate butyrate Cellite BP900 (Bayer) | 8.0 |
| 20 Secs cellulose acetate butyrate Cellite BP-1900 (Bayer) | 8.0 |

When pigmented, this formulation produces satisfactory paint at 18% solids, but not at a higher and more desirable solids level, for application to automobiles using conventional spraying and curing techniques.

EXAMPLE 1

| | Parts |
|---|---|
| Oil-free polyester resin at 65% solids in xylene with OH number about 100 and Mw about 10,000 | 37.0 |
| Hexamethoxymelamine crosslinker resin at 100% solids-Resimene 755 | 30.0 |
| Polyethylene vinyl acetate copolymer, as a 6% wax dispersion in xylene-butylacetate 40/54 | 3.0 |
| Urea modified acrylic resin at 70% solids in Solvesso 100 (Exxon)-xylene 89/11 ratio based on a partially styrenated acrylic with OH number about 145 and MW about 3000 polymerized in the presence of isocyanate and amine constituents to produce urea thixotropic agent in accordance with U.S. Pat. No. 4,311,622 - Buter (1982) | 30.0 |
| Dodecylbenzyl sulfonic acid acid catalyst | 0.8 |

With ordinary pigmentation this formulation at 35–40% spray solids produces desirable automotive paint by spraying and curing.

I claim:

1. A coating composition with a binder consisting essentially, in percent by weight, of a binder consisting essentially of about
   30–40% of a polyester resin,
   25–35% of a melamine crosslinker resin,
   2–5% of a ethylene vinyl acetate copolymer wax dispersion,
   25–30% of a styrenated acrylic resin with an isocyanate-amine thixotropic agent, so that the amount of thixotropic agent is 0.5–2% based on binder solids,
   plus flow additives,
   acid catalyst,
   said binder being dispersed in a liquid media comprising solvents at a binder solids content of about 35–40% by weight.
2. The coating composition of claim 1 also containing pigments and extenders.
3. The coating composition of claim 2 having a pigment-to-binder weight ration in the range of 10–40 units pigment per 100 units of binder.
4. The coating composition of claim 3 having a pigment-to-binder weight ratio of about 15 to 100.
5. The coating composition of claim 3 having a pigment-to-binder weight ratio of about 20 to 100.
6. The coating composition of claim 3 having a pigment-to-binder weight ratio of about 30 to 100.

* * * * *